(12) United States Patent
Dajaku (10) Patent No.: US 9,318,926 B2
(45) Date of Patent: Apr. 19, 2016

(54) ELECTRIC MACHINE

(75) Inventor: Gurakuq Dajaku, Neubiberg (DE)

(73) Assignee: FEAAM GmbH, Neubiberg (DE)

( * ) Notice: Subject to any disclaimer, the term of this patent is extended or adjusted under 35 U.S.C. 154(b) by 367 days.

(21) Appl. No.: 13/129,560

(22) PCT Filed: Nov. 13, 2009

(86) PCT No.: PCT/DE2009/001627
§ 371 (c)(1),
(2), (4) Date: Sep. 8, 2011

(87) PCT Pub. No.: WO2010/054651
PCT Pub. Date: May 20, 2010

(65) Prior Publication Data
US 2012/0025634 A1  Feb. 2, 2012

(30) Foreign Application Priority Data
Nov. 14, 2008 (DE) .......................... 10 2008 057 349

(51) Int. Cl.
*H02K 3/28* (2006.01)
*H02K 3/20* (2006.01)

(52) U.S. Cl.
CPC .. *H02K 3/28* (2013.01); *H02K 3/20* (2013.01); *H02K 2203/09* (2013.01)

(58) Field of Classification Search
CPC ........... H02K 1/165; H02K 3/12; H02K 3/28; H02K 21/12
USPC ............... 310/12.21, 179, 184, 195, 208, 216
See application file for complete search history.

(56) References Cited

U.S. PATENT DOCUMENTS

| | | |
|---|---|---|
| 3,622,823 A | 11/1971 | Richard et al. |
| 3,886,653 A | 6/1975 | Arnold |
| 4,354,127 A | 10/1982 | Stroud |
| 4,454,464 A | 6/1984 | Stroud |
| 5,424,599 A | 6/1995 | Stroud |
| 5,723,930 A | 3/1998 | Ho et al. |
| 6,011,339 A | 1/2000 | Kawakami |
| 6,380,648 B1 | 4/2002 | Hsu |
| 6,414,410 B1 | 7/2002 | Nakamura et al. |
| 6,479,911 B1 * | 11/2002 | Koike et al. ................. 310/49.24 |
| 6,504,283 B1 | 1/2003 | Asao et al. |
| 6,555,942 B1 | 4/2003 | Hsu |
| 7,388,311 B2 * | 6/2008 | Bhargava ....................... 310/184 |
| 7,830,060 B2 * | 11/2010 | Miyata et al. ................. 310/180 |

(Continued)

FOREIGN PATENT DOCUMENTS

| | | |
|---|---|---|
| AT | 101 170 | 10/1925 |
| CN | 102217172 | 10/2011 |

(Continued)

OTHER PUBLICATIONS

US english translation of EP 991164 A2, Apr. 2000, Altenbernd et al.*

(Continued)

*Primary Examiner* — Naishadh Desai
(74) *Attorney, Agent, or Firm* — Cozen O'Connor (57) ABSTRACT

An electrical machine is provided, comprising a stator (8) and a rotor (9). The stator comprises slots (1, 2) for receiving a coil of an electrical winding. The coil has a first number of turns (n1) in a first slot (1) and a second number of turns (n2) in a second slot (2).

12 Claims, 9 Drawing Sheets

(56) References Cited

U.S. PATENT DOCUMENTS

| | | | |
|---|---|---|---|
| 8,421,282 | B2 | 4/2013 | Ota |
| 2001/0030481 | A1 | 10/2001 | Itami et al. |
| 2002/0113518 | A1 | 8/2002 | Hsu |
| 2003/0173857 | A1 | 9/2003 | Jones |
| 2005/0156480 | A1* | 7/2005 | Imai et al. ............ 310/263 |
| 2007/0018525 | A1 | 1/2007 | Cai et al. |
| 2007/0057592 | A1* | 3/2007 | Bhargava ............ 310/184 |
| 2007/0075604 | A1 | 4/2007 | Hsu |
| 2007/0182267 | A1 | 8/2007 | Neet |
| 2007/0194650 | A1* | 8/2007 | Ito et al. ............ 310/179 |
| 2008/0136284 | A1 | 6/2008 | Fuji et al. |
| 2008/0185933 | A1 | 8/2008 | Baba |
| 2009/0179530 | A1 | 7/2009 | Neet |
| 2009/0243423 | A1 | 10/2009 | Hattori |
| 2009/0251024 | A1* | 10/2009 | Huppunen et al. ...... 310/195 |
| 2011/0043057 | A1 | 2/2011 | Ota |
| 2012/0228981 | A1 | 9/2012 | Dajaku |

FOREIGN PATENT DOCUMENTS

| | | | |
|---|---|---|---|
| DE | 2012468 | | 3/1969 |
| DE | 103 35 792 | | 3/2005 |
| DE | 102008051047 | A1 | 4/2010 |
| DE | 102008054284 | A1 | 5/2010 |
| DE | 102009036034 | A | 2/2011 |
| EP | 0 991 164 | | 4/2000 |
| EP | 991164 | A2 * | 4/2000 ............... H02K 3/28 |
| EP | 1 168 574 | | 1/2002 |
| FR | 1335551 | A | 8/1963 |
| FR | 2418564 | A | 9/1979 |
| GB | 2015829 | A | 9/1979 |
| WO | WO 02/099951 | A1 | 12/2002 |
| WO | WO 2005/034308 | | 4/2005 |
| WO | WO 2005/034308 | A1 | 4/2005 |
| WO | WO 2008/044703 | A1 | 4/2008 |
| WO | WO 2008/074910 | | 6/2008 |
| WO | WO 2008/074910 | A1 | 6/2008 |
| WO | WO 2010/040785 | A2 | 4/2010 |
| WO | WO 2010/054651 | | 5/2010 |
| WO | WO 2010/060409 | A1 | 6/2010 |
| WO | WO 2011/015606 | A1 | 2/2011 |

OTHER PUBLICATIONS

Office Action dated Jul. 31, 2014 in U.S. Appl. No. 13/389,220.
Office Action dated Dec. 28, 2012 issued by the Chinese Patent Office in the corresponding Chinese patent application No. 200980145694.5.
U.S. Patent Office Action issued in U.S. Appl. No. 13/389,220 dated Jun. 19, 2015.

* cited by examiner

Fourier components

ELECTRIC MACHINE

RELATED APPLICATIONS

This application is a U.S. National Phase Application under 35 USC 371 of International Application No. PCT/DE2009/001627 filed on Nov. 13, 2009.

This patent application claims the priority of German patent application 102008057349.3 filed Nov. 14, 2008, the disclosure content of which is hereby incorporated by reference.

FIELD OF THE INVENTION

The present invention relates to an electrical machine.

BACKGROUND OF THE INVENTION

Electrical machines usually comprise a housing-fixed stator as well as a rotor which can be moved relative to the stator. The rotor may be supported so as to be rotatable with respect to the stator or so as to be linearly movable relative thereto, for instance. Electrical machines are classified as electro-mechanical energy converters. In that context, they may operate as a motor or generator.

Electrical machines may be used for the propelling system in motor vehicles, for instance. To this end as well as for other applications, it may be of advantage to achieve defined characteristics of the operational behavior of the electrical machine. The torque, the acoustic properties, the iron losses as well as the losses in the windings and in the magnets may be among these characteristics.

A stator of an electrical machine with concentrated windings is distinguished by a compact design compared to those with distributed windings. Here, different pole pair numbers may be combined with differing numbers of slots in the stator. The number of the pole pairs in the rotor is understood to be the pole pair number. The slots in the stator serve to receive the windings. Each magnetic pole pair in the rotor normally comprises two magnetic poles, a north pole and a south pole.

Document US 2007/0194650 A1, for instance, describes an electrical machine comprising twelve slots and ten poles. In a machine of this type, the magnetomotive force MMK induced in operation by the stator is not distributed according to a simple sine wave. Rather, it is obvious when analyzing the magnetomotive force and its harmonic components, for instance by means of a Fourier decomposition, that numerous undesired harmonic components occur. Here, all harmonic components other than the one used as the operating wave of the electrical machine are undesired as these may result in losses and, in addition, may cause undesired acoustic impairments.

It is not necessarily the main wave which is applied as the operating wave in machines with concentrated windings. It may rather be of advantage to use a higher-order harmonic component of the magnetomotive force as the operating wave.

To give an example, the fifth or seventh harmonic component may be used as the operating wave in an electrical machine comprising a stator with concentrated windings, two adjacent teeth being provided with coils of a strand (sometimes also referred to as "phase") and in the opposite winding sense. In the basic form, this results in a machine with twelve slots and ten poles or with twelve slots and 14 poles. Integer multiples of the number of the slots and of the number of the poles are also possible here.

SUMMARY OF THE INVENTION

One object of the present invention to achieve a reduction of the subharmonic component in an electrical machine at low expenditure. In the present case, the term "subharmonic component" is related to the operating wave.

In one embodiment of the invention, the electrical machine comprises a stator and a rotor which can be moved relative to the stator. The stator comprises slots for receiving a coil of an electrical winding. In a first slot, the coil has a first number of turns. The same coil features a second number of turns in another slot of the stator, which differs from the first number of turns.

The suggested implementation of the winding including coils which have differing numbers of turns in various slots of the stator allows a significant reduction of e.g. the first subharmonic component of the Fourier decomposition of the magnetomotive force or eliminating it.

To this end, neither additional windings are required which are to be inserted in the slots, nor modifications on the stator geometry or on the rotor are needed.

It is preferred that the coil is inserted into the stator from a main side of the stator other than that where it exits the slot. In other words, the terminals of a coil are not provided on a common, i.e. the same main side of the stator like in a conventional way, but on different main sides of the stator.

In a rotating electrical machine, for instance, one main side of the stator comprises a surface normal in axial direction.

It is preferred that the second number of turns differs from the first number of turns.

The second number of turns is preferably greater than the first number of turns.

In one embodiment, the sum of the numbers of turns in the first slot differs from the sum of the numbers of turns in the second slot. In the case of several coils per slot, the sum of the numbers of turns of these coils in the respective slot is understood as the sum of the numbers of turns. The first and second slots are preferably arranged so as to be adjacent to each other.

The first number of turns n1 preferably amounts to between including 50% and excluding 100% of the second number of turns n2. In other words, the ratio between the first number of turns n1 and the second number of turns n2 is greater than or equal to 0.5 and smaller than 1.

To give an example, the coil is placed in the stator in the second slot and extends through this second slot until it exits the stator on its opposite main side. Then, a further full turn of 360° takes place around a tooth where this second slot is located. In this arrangement, the turn is laid through the first slot and back through the second slot. This is why the coil exits the stator on a main side other than the one where it has entered it. Hereby, the second number of turns n2 is two times the amount of the first number of turns n1. In other words, the first number of turns n1 amounts to 50% of the second number of turns n2 in the second slot.

It is preferred that a further coil with the first number of turns is provided in the first slot in addition to the mentioned coil. In this implementation, a further coil of the second number of turns is provided in the second slot.

In one embodiment, none of the slots shows a combination of different numbers of turns. Rather, coils are inserted in a slot which all have the same number of turns in this slot; this is preferably true for all slots of the stator.

In one implementation, the coils of the first slot originate from the same strand and the coils in the second slot originate from different strands.

Here, each strand of the electrical machine is assigned to one electrical phase of the electrical machine so that different strands are assigned to different electrical phases.

Those coils, for example, which are provided in one slot and originate from the same strand have the first number of turns in this slot. In those slots where coils of different strands are inserted, these have the second number of turns in this slot. Preferably, the slots of the first and second numbers of turns alternate periodically in the stator along a moving direction of the rotor.

It is preferred that coils of the same strand have the same current direction in the respective slot. Neighboring coils of the same strand may be wired with opposite winding sense.

Coils of different strands have opposite current directions in these slots. In this arrangement, the neighboring coils of different strands may be wired in the same winding sense.

The stator preferably comprises a three-phase winding including three strands which each are associated with one electrical phase. The related electrical system is a three-phase system with three phases which are phase-shifted by 120° in each case.

The stator preferably is a stator with concentrated windings. It is preferred here that two adjacent teeth of the stator, which are each formed between neighboring slots of the stator, comprise coils of a strand and opposite winding sense.

In one implementation, the slots in the stator are equidistantly distributed.

All teeth may have the same geometry.

Likewise, all slots in the stator may have the same geometry.

The invention is preferably applicable to an electrical machine with twelve slots in the stator and ten magnetic poles in the rotor. As an alternative, the electrical machine may comprise twelve slots in the stator and 14 magnetic poles in the rotor, for instance. Still alternatively, identical integer multiples of the number of the slots and of the number of the poles may be provided.

Alternatively or additionally, the electrical machine may comprise one of the following types: linear machine, axial-flux type machine, radial-flux type machine, asynchronous machine, synchronous machine.

The electrical machine may be constructed as a machine with internal rotor or as a machine with external rotor.

The rotor of the suggested electrical machine may be one of the following types, for example: a cage rotor, a multi-layer rotor in the case of the asynchronous machine, or a permanent magnet rotor in the case of the synchronous machine, a rotor with buried magnets or an electrically supplied rotor such as a full-pole type rotor, salient-pole type rotor, heteropolar rotor, homopolar rotor.

In a further development, the stator has a doubled number of slots with respect to the required minimum number of slots for a given pole pair number p of the rotor. Regarding said doubling of the slots in the stator, reference is made to the patent application 10 2008 051 047.5 of the present applicant, which has been filed with the German Patent and Trademark Office on Oct. 9, 2008. In this respect, reference is made to this patent application in its entirety.

BRIEF DESCRIPTION OF THE DRAWINGS

In the drawings, identical parts or parts having the same effect are provided with identical reference numerals.

DETAILED DESCRIPTION OF THE DRAWINGS

Figure 1:
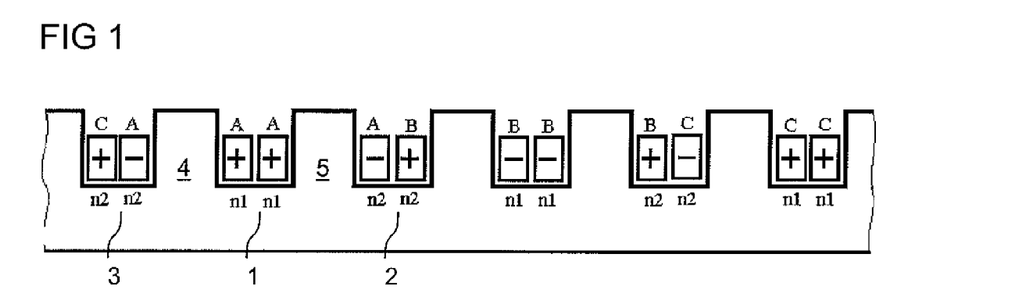
FIG. 1 shows a first exemplary embodiment of the invention on the basis of a cut-out of a stator.

FIG. 1 shows an exemplary embodiment of a stator according to the invention on the basis of a cut-out in cross-sectional illustration. The electrical machine is exemplarily designed as a linear machine. A coil of a first strand A of an electrical winding is inserted in a first slot 1 and in a second slot 2. The coil of the strand A has a first number of turns n1 in the first slot 1, and the same coil has a second number of turns n2 in the second slot 2. A further coil of the first strand A is placed in the first slot 1 and in the third slot 3 drawn on the left-hand side thereof. This further coil also has the number of turns n1 in the first slot 1, while it has the second number of turns n2 in the third slot.

Apart from the mentioned numbers of turns which in the present case are different in various slots with identical coils, as seen from the viewpoint of winding topology, this is a matter of a conventional winding topology as it is provided in electrical machines with twelve slots, ten poles and three strands. Here, the electrical strands are designated with A, B, C and each assigned to one electrical phase in a three-phase system. The signs +, – represent the winding sense.

It is possible with the suggested principle to significantly reduce, for example, the first subharmonic component of the Fourier decomposition of the magnetomotive force, as will be explained in more detail below.

Figure 2:
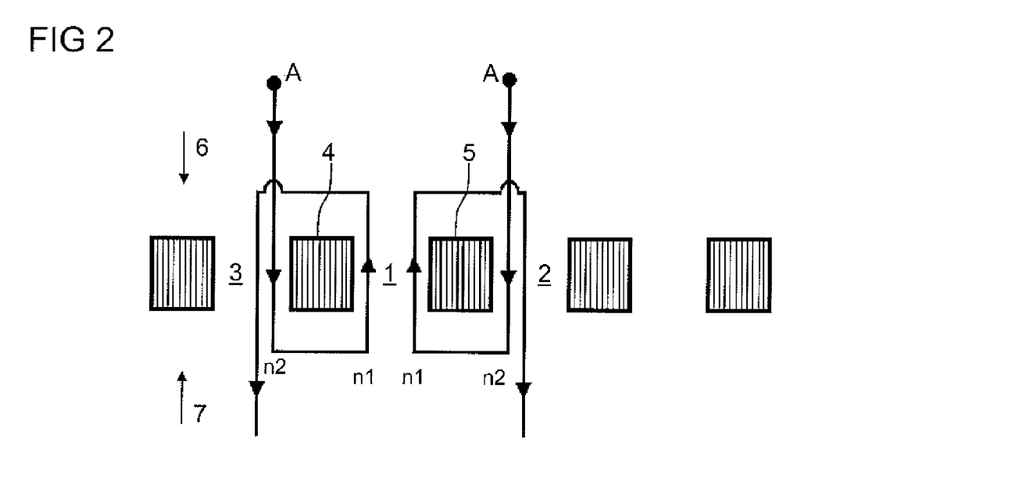
FIG. 2 shows an exemplary embodiment of a coil according to the invention.

FIG. 2 shows an exemplary embodiment of a stator in a top view. For better overview, only those two coils are shown which are laid around the two teeth 4, 5 formed between the first and third or first and second slots, respectively. It can be seen that the different numbers of turns n1, n2 in the various slots 1, 2, 3 are achieved in that the coil enters the stator on a main side 6 which is not the side where it exits again, namely on the opposite main side 7. One can further see that the two coils around the two teeth 4, 5 are those of the same strand A. Here, the winding process has been carried out in such a way that coils of the same strand in a shared slot 1 have the same number of turns n1.

Reference numeral n2 refers to the number of turns of the coils in those slots 2, 3 which carry coils of windings of different strands A, B, C.

Figure 3:
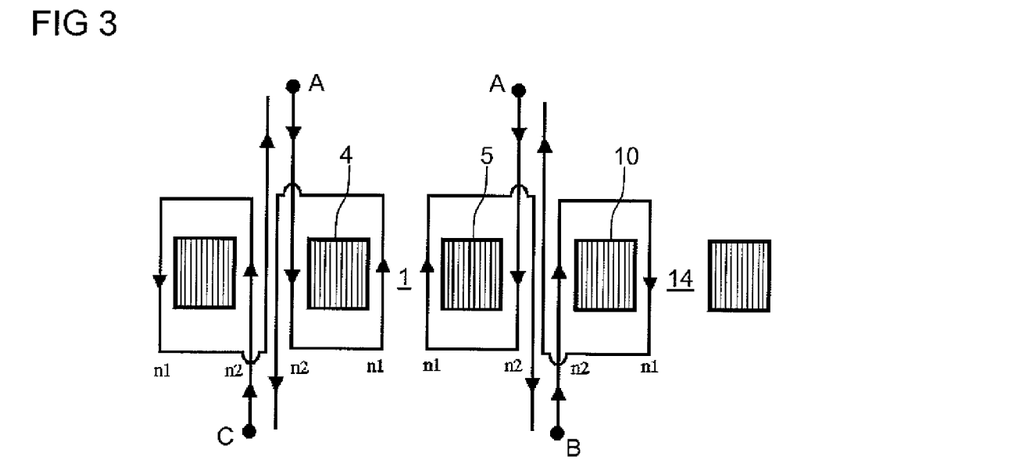
FIG. 3 shows a further exemplary embodiment of a coil according to the invention.

Whereas FIG. 2 shows only a single strand A, several strands A, B, C are drawn in FIG. 3. One can see that different strands A, C are located in the third slot 3 and different strands A, B are located in the second slot 2 in FIG. 3, the coils each having the second number of turns n2. Further, it is obvious that the coils are wired such that a current flow heading in the same direction is achieved in those slots 1 which are occupied with coils of the same strand A, whereas the coils in the slots 2, 3 are wired with different strands for opposite current flows in these slots.

Two adjacent teeth 5, 10 of the stator, which are formed between neighboring slots 1, 2; 2, 14 of the stator in each case, comprise coils of different strands A, B and with the same winding sense.

The ratio between the first and second numbers of turns, with different inlet and outlet points of the coils with respect to the main sides of the stator, is described here as follows:

$n1=n2-1$ and $50\% \leq n1/n2 < 100\%$.

Figure 10:
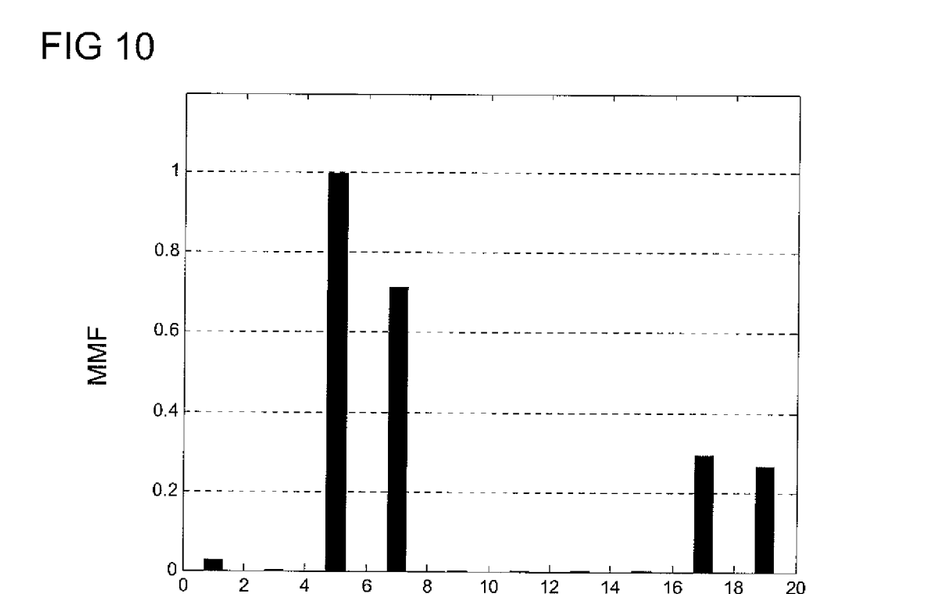

Due to the adjustable turn number ratio between including 50% and <100%, the first subharmonic component can be reduced to 0, as is exemplarily shown in FIG. 10.

An advantage of the suggested principle, as is exemplarily shown on the basis of FIGS. 1 to 3, is to be seen in the fact that no compensation windings or additional windings are required for the reduction of the first subharmonic component.

Figure 4:
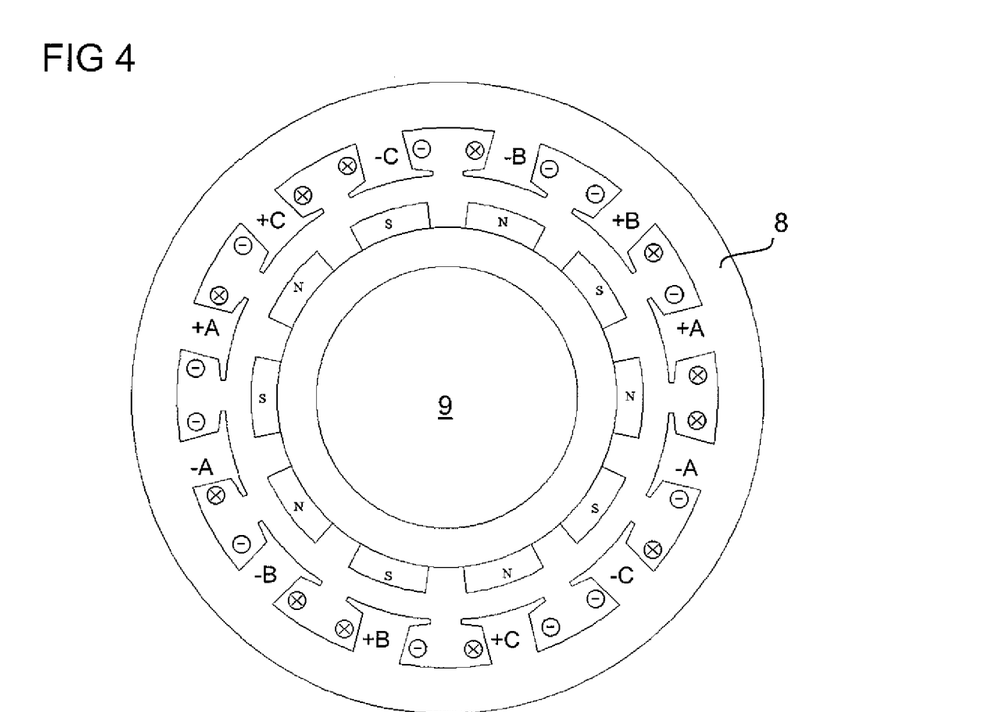
FIG. 4 shows an exemplary embodiment of a rotating electrical machine.

FIG. 4 shows an implementation of the suggested principle on the basis of an entire stator 8 and rotor 9 of a rotating electrical machine. The stator comprises twelve slots, for instance, whereas the rotor comprises five pole pairs, i.e. ten poles S, N. The winding topology with concentrated windings is applied in counter-clockwise direction according to the following scheme: −A, +A, +B, −B, −C, +C, +A, −A, −B, +B, +C, −C.

Figure 5:
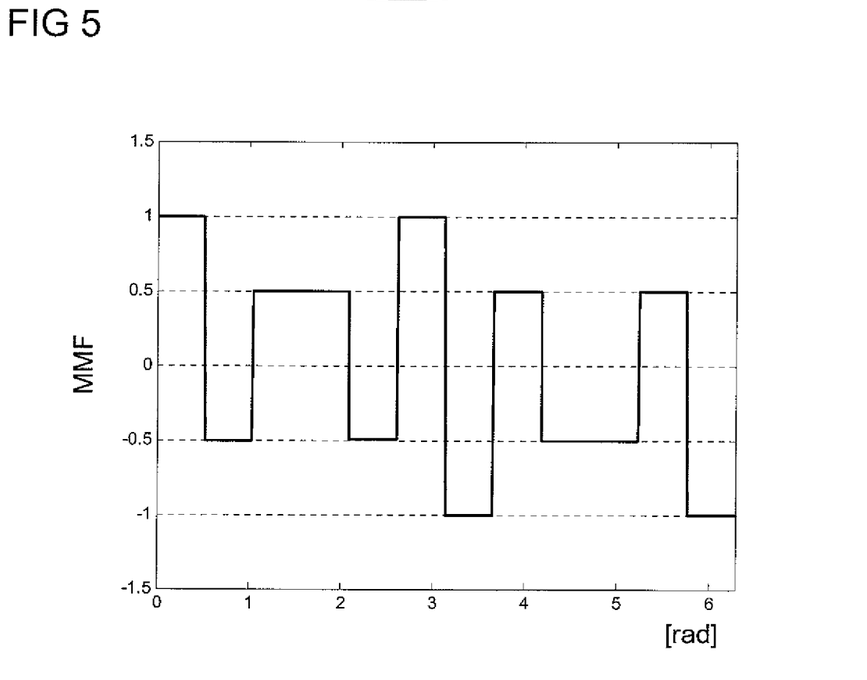
FIG. 5 shows an exemplary diagram of the magnetomotive force versus the angular position in [rad]
Figure 6:
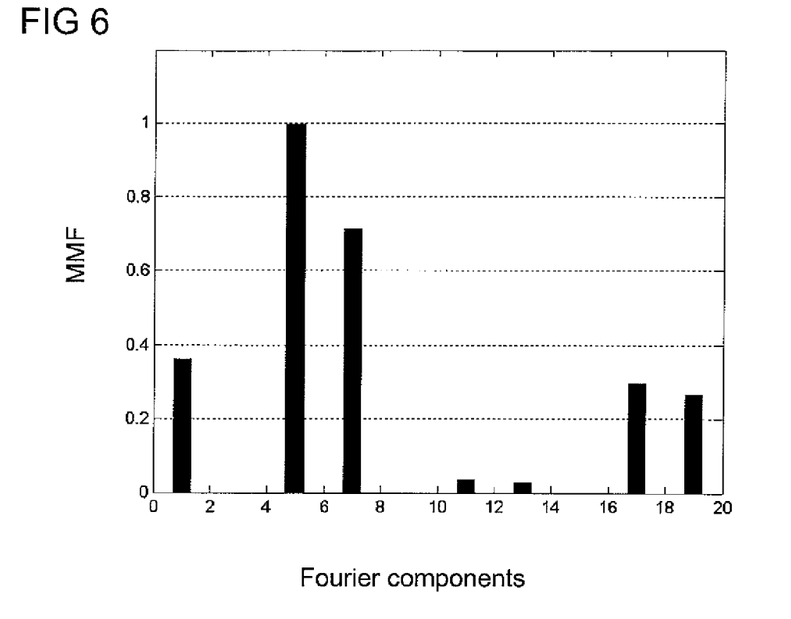
FIG. 6 shows a distribution of the magnetomotive force versus the Fourier components.

FIGS. 5 and 6 show graphs of the magnetomotive force MMK versus the angular position [rad] and versus the Fourier components, respectively, for a conventional machine with the topology of FIG. 4, but without the different numbers of turns according to FIGS. 1 to 3.

One can see that it makes sense to utilize the fifth harmonic component as the operating wave. In particular the first and the seventh harmonic component are undesired harmonic components. In alternative implementations, the seventh harmonic component may be used as the operating wave. To this end, 14 poles are to be provided in the rotor instead of the ten poles shown, which likewise are symmetrically distributed along the circumference. The reduction of the first harmonic component is of high importance in particular with respect to rotor losses.

Figure 7A:
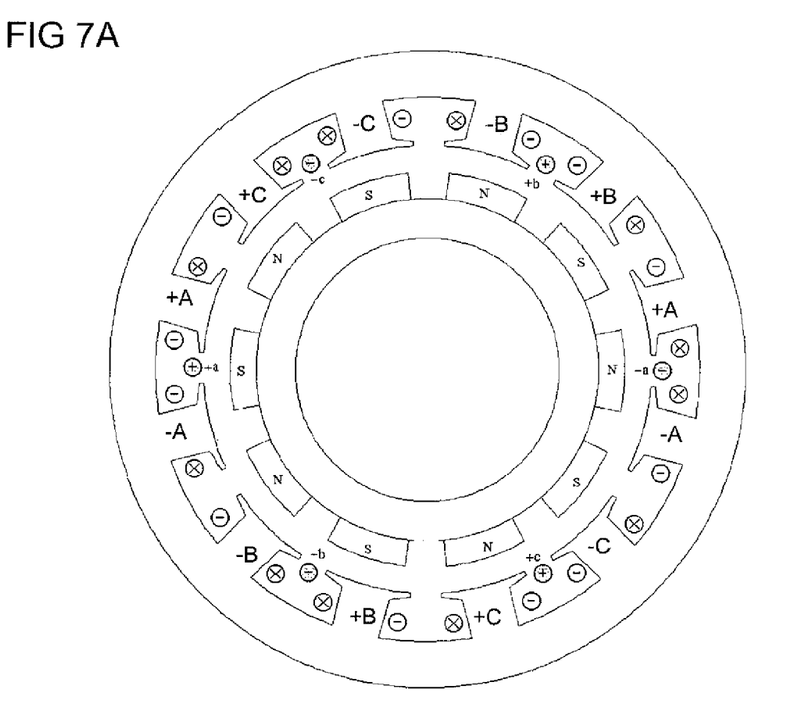
FIG. 7A shows a further development of the electrical machine of FIG. 4 with compensation windings.

FIG. 7A shows an alternative to the exemplary embodiments of FIGS. 1 to 3 which have different numbers of turns n1, n2. The explanation on the basis of FIG. 7A serves for better understanding of the functional principle of the suggested matter.

In FIG. 7A, all main windings have the same number of turns as with a conventional 12/10-type machine comprising twelve slots and ten poles. However, a distributed additional winding is provided which is inserted in every second slot and serves to attenuate the first subharmonic component. This additional winding is also referred to as a compensation winding in the following.

Figure 7B:
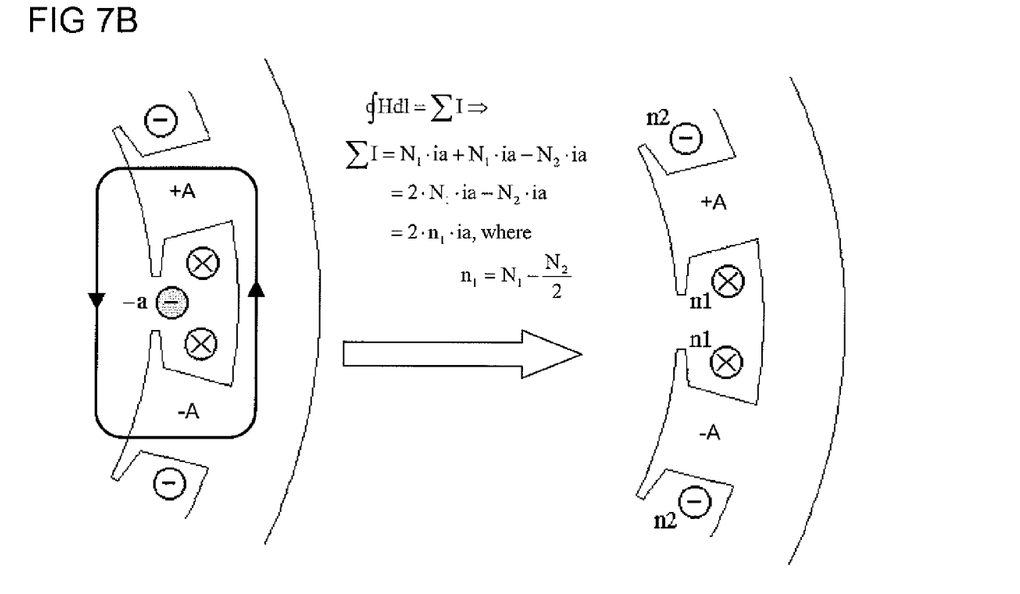
FIG. 7B shows a comparison of the compensation windings and the suggested coils with different numbers of turns in the slots on the basis of an example.

The left half of the image of FIG. 7B shows a cut-out of this compensation winding designated by -a there. Correspondingly, there are two further compensation windings b and c.

The number of turns of the main winding A, B, C is referred to as $N_1$ and the number of turns of the additional windings a, b, c is designated with $N_2$.

The additional winding according to FIG. 7A creates a magnetomotive force which is dimensioned such that the first subharmonic component according to FIG. 6 is exactly compensated for by an opposite component of the magnetomotive force. By means of a specific ratio between N1 and N2, the resulting first harmonic component of the magnetomotive force may be fully eliminated. This is shown on the basis of FIG. 10.

Figure 8:
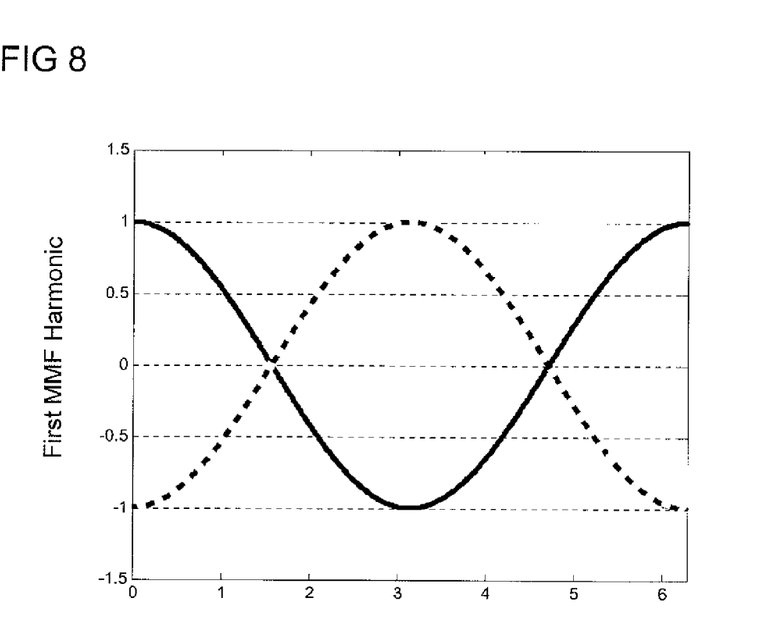
FIG. 8 shows the distribution of the first harmonic component of the magnetomotive force according to the implementation of FIG. 7A, FIGS. 9 and 10 show graphs of the magnetomotive force versus the angular position in [rad] respectively the Fourier components according to the implementation corresponding to the invention.

This principle of opposed curve profiles is further explained in FIG. 8 in which the solid line describes the first harmonic component of the magnetomotive force of the main winding A, B, C of FIG. 7A, whereas the broken line refers to the first harmonic component of the magnetomotive force of the additional winding a, b, c. The opposed curve profile is apparent from FIG. 8 and results in the first subharmonic component exactly disappearing.

FIG. 7B further shows how the winding topology comprising the additional windings a, b, c according to FIG. 7A, on the one hand, and the winding topology as exemplarily shown on the basis of FIGS. 1 to 3, on the other hand, may be converted into each other. As made clear on the basis of FIG. 7B, the reduction of the first subharmonic component can be achieved in equivalent manner by using coils instead of the compensation windings a, b, c, which have different numbers of turns n1, n2 in various slots. Reference numeral n1 describes the first number of turns of these coils which are introduced in slots receiving coils of the same strand, while n2 describes the second number of turns in slots which receive coils of different strands A, B, C.

The conversion of the implementations according to FIG. 7B left and FIG. 7B right can be described with the example of strand A and on the basis of FIG. 7A by the following mathematic expressions. In terms of the resulting number of turns, the following is true:

$$\sum I = N1 \cdot ia + N1 \cdot ia - N2 \cdot ia$$
$$= 2 \cdot N1 \cdot ia - N2 \cdot ia,$$

wherein N1 designates the number of turns of the main winding, N2 the number of turns of the additional winding, $\Sigma I$ the total current in the slot receiving coils of the same strand, and is the current of the strand A also flowing in the compensation winding a.

The formula may be transformed to:

$$\sum I = 2 \cdot n1 \cdot ia, \text{ with } n1 = N1 - \frac{N2}{2}, \text{ wherein}$$

n1 designates the number of turns of the coils in the slots receiving coils of the same strand.

Analog ratios apply for the currents ib, ic of the two other strands B, C.

In an analog manner, the number of turns of the coils in those slots which receive coils of different strands, for instance for the strands A, B, will result in:

$$\sum I = -N1 \cdot ia + N1 \cdot 1b, = -n2 \cdot ia + n2 \cdot ib, \text{ with } n2 = N1, \text{ wherein}$$

n2 designates the number of turns of the coils in slots with coils of different strands.

Same applies for the strands A and C as well as for the strands B and C.

It follows from a comparison of the two equations that the first and second numbers of turns n1, n2 in FIG. 7B must be unequal. Therefore:

$$n1 \neq n2$$

Thus, it can be seen that the implementation according to the suggested principle of different numbers of turns in the same coils, but with different slots of these coils, is equivalent to the implementation with compensation windings a, b, c and makes these unnecessary. Hereby, it is possible with advantage to achieve the desired success, i.e. to reduce or avoid the first subharmonic component, with a simple winding structure.

Figure 9:
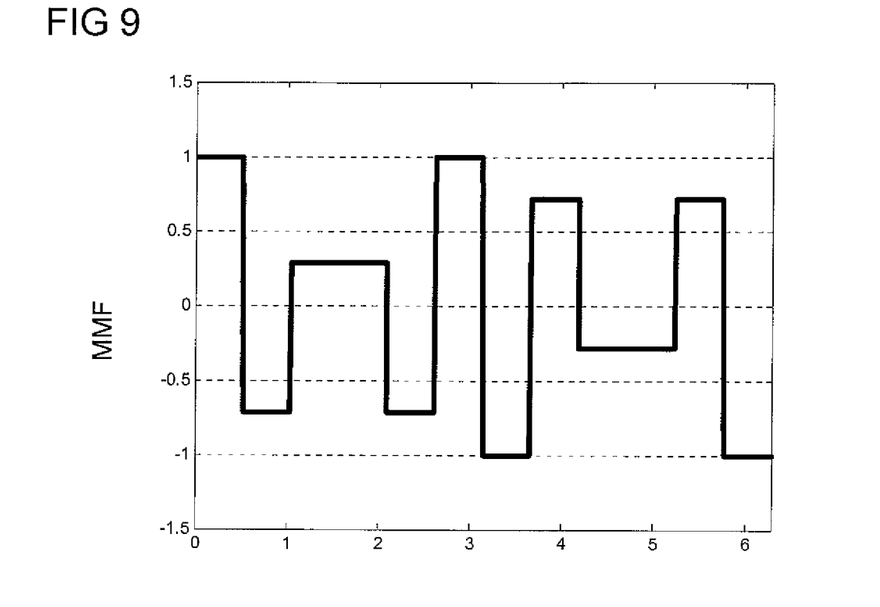

FIGS. 9 and 10 show the distribution of the magnetomotive force versus the angular position in [rad] and on the basis of the decomposition of the Fourier components, respectively. These FIGS. 9 and 10 apply for the embodiments according to FIGS. 7A and 7B left side as well as for the embodiments according to FIG. 7B right side and FIGS. 1 to 3 of the invention.

Figure 11:
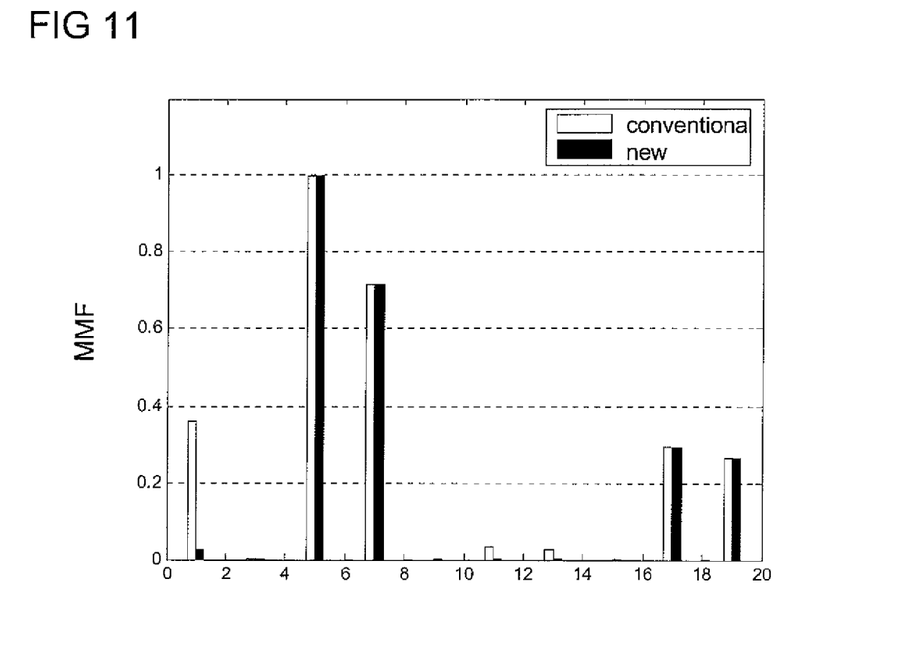
FIG. 11 shows an example of a comparison of the diagrams of FIG. 6 and FIG. 10.

FIG. 11 shows a comparison of the graphs of FIGS. 6 and 10.

Figure 12:
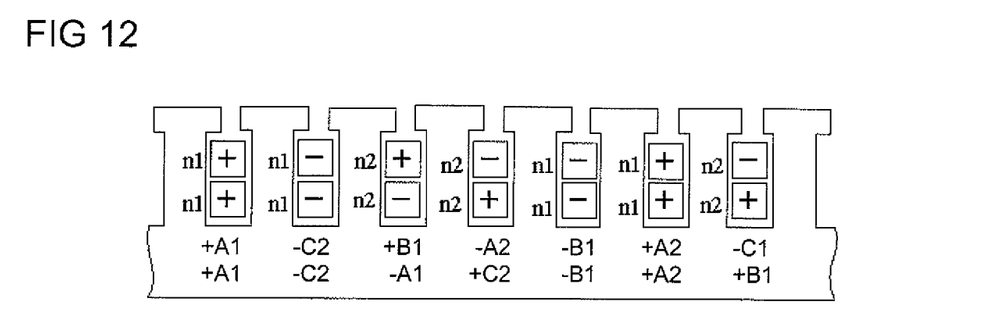
FIG. 12 shows an exemplary embodiment of the invention for an electrical machine with 24 slots and ten poles.

FIG. 12 shows a further development of the principle which is exemplarily illustrated on the basis of FIG. 1. Here, the principle of a 12/10 topology of the electrical machine is transferred to a 24/10 topology which relates to a winding topology for an electrical machine with 24 slots and ten poles. Here too, the subharmonic component can be reduced to 0 with a specific relation between the first number of turns n1 and the second number of turns n2.

It has been exemplarily explained in preceding implementa-tions that the reduction of the subharmonic component on the basis of a winding topology with twelve slots and ten poles may be achieved in that different numbers of turns of the same coil are inserted in different slots. In this way, the additional winding a, b, c can be avoided as it has been shown on the basis of FIG. 7A.

Figure 13:
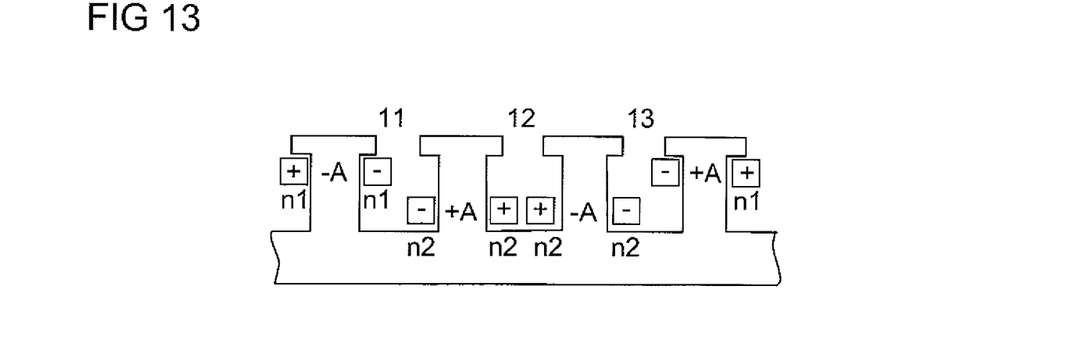
FIG. 13 shows another further development of the invention with an additional concentrated winding.

As an alternative, a different effective number of turns may also be achieved by an additional concentrated winding, as it is shown on the basis of FIG. 13. For simplification, only strand A is illustrated. The number of turns of the main winding is referred to as n'2, whereas the number of turns of the concentrated additional winding is designated with n'1.

FIG. 13 illustrates that the resulting number of turns is increased in the slots 11 and 13 with respect to the slot 12 lying in between. The first harmonic component of the magnetomotive force resulting from the entire winding topology can be reduced to 0 for a specific ratio between the number of turns n'2 of the main winding and the number of turns n'1 of the concentrated additional winding.

Figure 14:
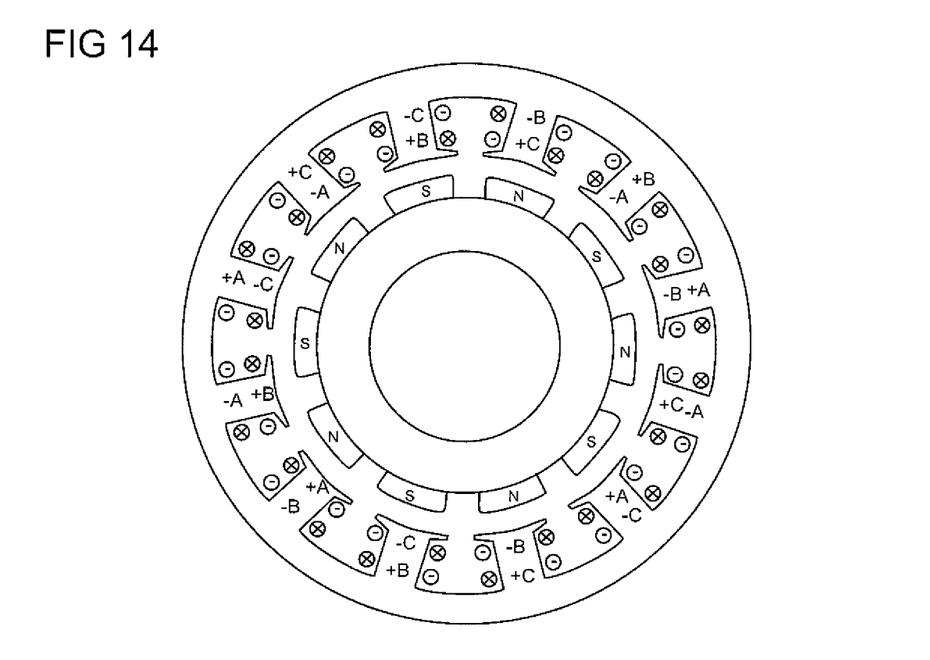
FIG. 14 shows the exemplary embodiment of FIG. 13 on the basis of a rotating electrical machine.

FIG. 14 shows the complete winding topology of the principle of FIG. 13 with a rotating electrical machine comprising twelve slots and ten poles.

Figure 15:
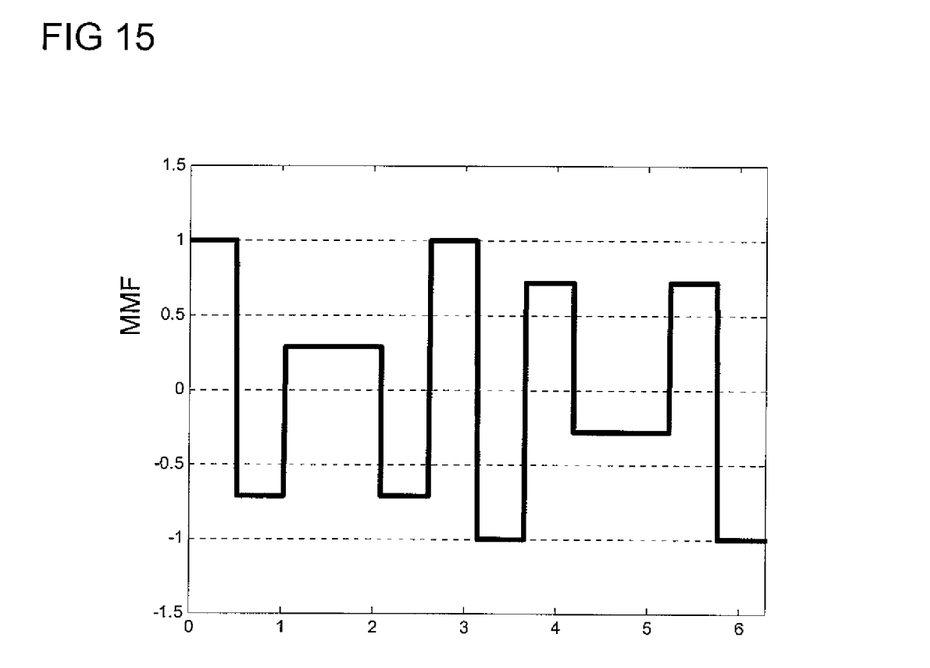
FIG. 15 shows an exemplary diagram of the magnetomotive force versus the angular position for the example of FIG. 14.
Figure 16:
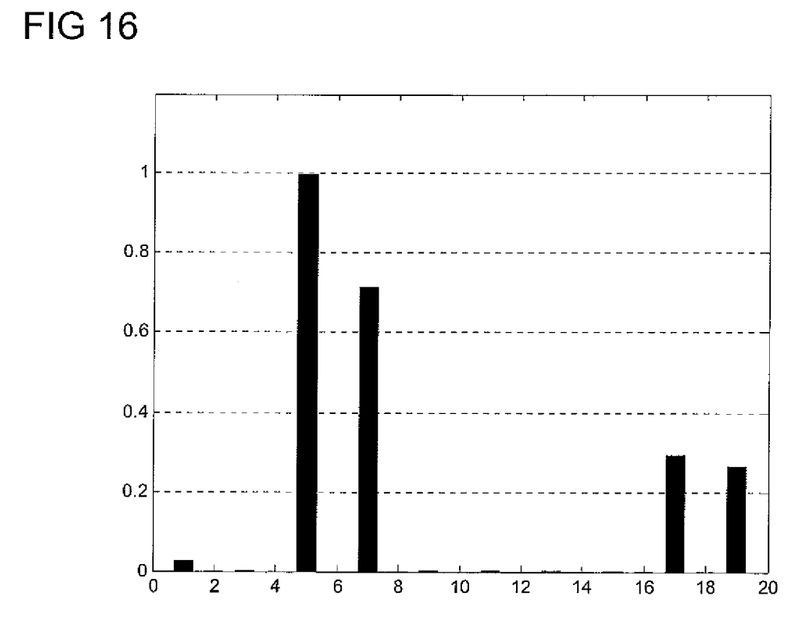
FIG. 16 shows an exemplary embodiment of a diagram of the magnetomotive force versus the Fourier components in the implementation of FIG. 14.

FIGS. 15 and 16 show the magnetomotive force versus the angular position in [rad] and the Fourier components of the corresponding decomposition with respect to the exemplary embodiment of FIG. 14, respectively.

Figure 17:
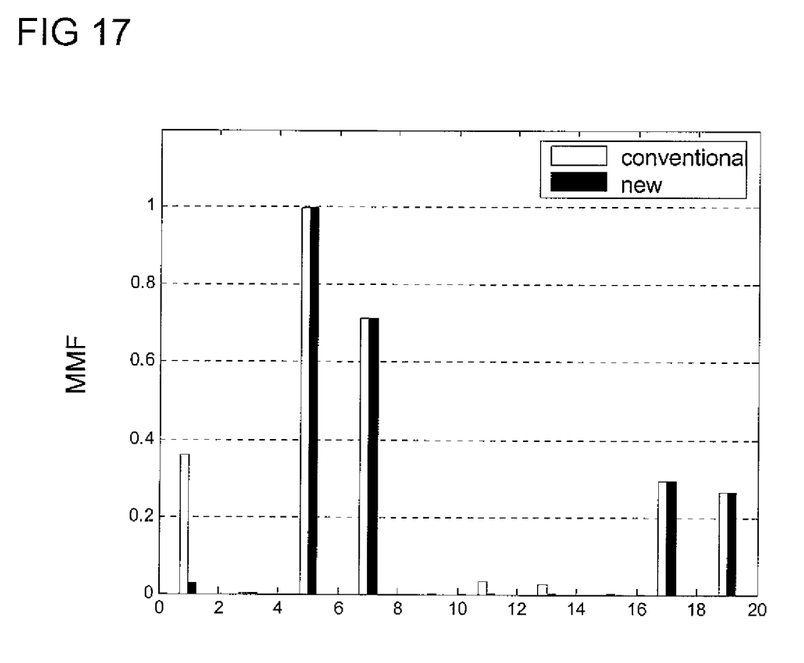
FIG. 17 shows the diagram of FIG. 16 compared to a conventional electrical machine.

FIG. 17 illustrates a comparison regarding the diagrams of the decompositions of the magnetomotive force into the Fourier components. The exemplary embodiments according to FIGS. 16 and 6 are compared to each other here.

Figure 18:
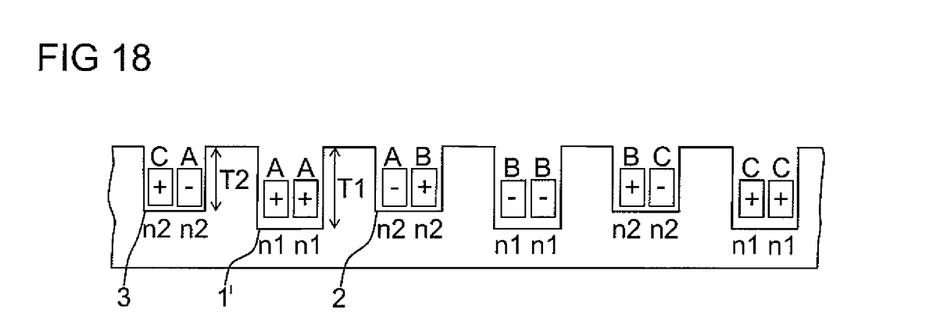
FIG. 18 shows an exemplary further development of FIG. 1 comprising slots with different depths.

FIG. 18 shows an exemplary further development of FIG. 1 in which the slots have different depths. Here, the second and third slots 2, 3 have an unchanged slot depth T2 compared to the implementation of FIG. 1. The first slot 1', however, has a first slot depth T1 which is larger than the slot depth T2 of the second and third slots 2, 3.

In FIG. 18, all slots comprising coils of the first number of turns n1 are basically formed so as to have the larger depth T1 in such respective slot.

This allows a further reduction of the main wave.

As an alternative to the implementation shown in FIG. 18, it would also be possible in an implementation (not shown here) that starting from FIG. 1 the first slot 1 has an unchanged depth; instead, the depth of the second and third slots is increased.

By this measure, the current density in the second and third slots, for instance, under consideration of the higher number of turns n2 may be as high as in the first slot 1.

Alternatively or in addition, the slot with the larger depth may be used for a better cooling effect, e.g. by introducing cooling ducts in the deeper slot.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An electrical machine, which uses a higher-order harmonic component of the magnetomotive force as the operative wave, the electrical machine comprising:
   a coil formed by a strand of an electrical winding;
   a stator including a plurality of teeth forming slots between the teeth for receiving the coil of the electrical winding; and
   a rotor which can be moved relative to the stator,
   wherein the strand is wrapped around at least one of the plurality of teeth to form a coil,
   wherein, for at least one of the plurality of teeth, in a first slot on one side of the at least one of the plurality of teeth, the strand is present on the at least one of the plurality of teeth a first number of times, and wherein, in a second slot on another side of the at least one of the plurality of teeth, the strand is present on the at least one of the plurality of teeth a second number of times, the second number being different than the first number, and
   wherein a further coil is present in the first slot the first number of times and a further coil is present in the second slot the second number of times, the first number differing from the second number.

2. The electrical machine according to claim 1, wherein the stator comprises two opposite main sides for making contact with the electrical winding, a first terminal of the coil being formed on a first main side of the opposite main sides and a second terminal of the coil being formed on a second main side of the opposite main sides.

3. The electrical machine according to claim 1, wherein in neighboring slots the sums of the numbers of turns in said slots are different.

4. The electrical machine according to claim 1, wherein the coils in the first slot are from the same strand and the coils in the second slot are from different strands.

5. The electrical machine according to claim 4, wherein the stator is configured as a stator with concentrated windings, wherein two adjacent teeth of the stator, which are each formed between neighboring slots of the stator, are provided with coils of different strands and the same winding sense.

6. The electrical machine according to claim 1, wherein the stator comprises a three-phase winding including three strands which each are associated to one electrical phase.

7. The electrical machine according to claim 1, wherein the stator is configured as a stator with concentrated windings, wherein two adjacent teeth of the stator, which are each formed between neighboring slots of the stator, are provided with coils of a strand and opposite winding sense.

8. The electrical machine according to claim 1, wherein the ratio of the number of the slots of the stator in relation to the number of the magnetic poles in the rotor is 12/10 or 12/14 or represents integer multiples of the number of the slots and of the number of the poles.

9. The electrical machine according to claim 1, wherein the electrical machine comprises one of the following types: linear machine, axial-flux type machine, radial-flux type machine, asynchronous machine, synchronous machine.

10. The electrical machine according to claim 1, constructed as a machine with an internal rotor or as a machine with an external rotor.

11. The electrical machine according to claim 1, wherein the rotor is one of the following types:
a cage rotor, a multi-layer rotor in the case of the asynchronous machine, or a permanent magnet rotor in the case of the synchronous machine, a rotor with buried magnets or an electrically supplied rotor, in particular full-pole type rotor, salient-pole type rotor, heteropolar rotor, homopolar rotor.

12. The electrical machine according to claim 1, wherein the first slot has a first slot depth which differs from a second slot depth of a second slot.

* * * * *